Feb. 23, 1960   N. D. STURGES   2,926,210
SELF-SEALING BATTERY TERMINAL
Filed July 2, 1958

INVENTOR.
NORMAN D. STURGES
BY
Pennie, Edmonds, Morton, Barrows & Taylor
ATTORNEYS United States Patent Office 2,926,210
Patented Feb. 23, 1960

2,926,210

SELF-SEALING BATTERY TERMINAL

Norman D. Sturges, New York, N.Y.

Application July 2, 1958, Serial No. 746,159

6 Claims. (Cl. 136—168)

This invention relates to means for supporting and hermetically sealing a conductive post in a hole through a plate of rigid material, so as to comprise a self-sealing electric terminal suitable for electrolytic cells, especially storage battery cells.

The sealing of storage battery terminal posts in the top of the case of a storage battery cell is an old and continuing problem. The problem is due primarily to three causes: First, the liquid electrolyte, especially sulfuric acid, has the physical property of working its way through extremely small spaces such, for example, as would constitute complete seals to many other liquids. Second, during the use of a storage battery cell, gas is generated within the cell, especially during charging, and this encourages the mentioned leakage. Third, because of unusual strains to which battery terminal posts are frequently subjected, an originally tight seal is often loosened.

Heretofore the most generally employed means for sealing storage battery terminal posts has comprised a thermoplastic pitch compound. This, however, has its limitations, especially in respect to battery cells which are subjected to low temperatures, tending to make the sealing compound brittle and causing it to be less adhesive and more readily fractured. As a result, traces of acid are usually present around the terminals of such cells. In an effort to overcome these and other disadvantages a variety of closures or seals have been proposed, but none provides the advantages of the self-sealing terminal of the present invention.

More especially, the invention comprises means for supporting and hermetically sealing a battery terminal post, or the like, in a hole through a rigid coverplate, comprising a grommet of resilient, compressible, rubber-like material formed with a stem portion and a flange portion preferably integral therewith, disposed at one end of the stem, this stem having an external diameter such as to fit snugly in the hole through the mentioned plate. When undistorted, the stem is of length substantially equal to the thickness of the plate. To effect the seal, this grommet is provided with a tapered central aperture therethrough. The taper is preferably uniform, although not necessarily so. The maximum diameter of the aperture is at the shoulder end of the grommet and is proportioned so that the post may enter it without substantial distortion of the grommet. The minimum diameter of the aperture is at the opposite end of the grommet and is considerably less than the larger diameter, as well as less than that of the post to be inserted therein.

The nature of the invention and its many novel advantages will be better understood from the following description considered in connection with the accompanying drawing, in which.

Figure 1:
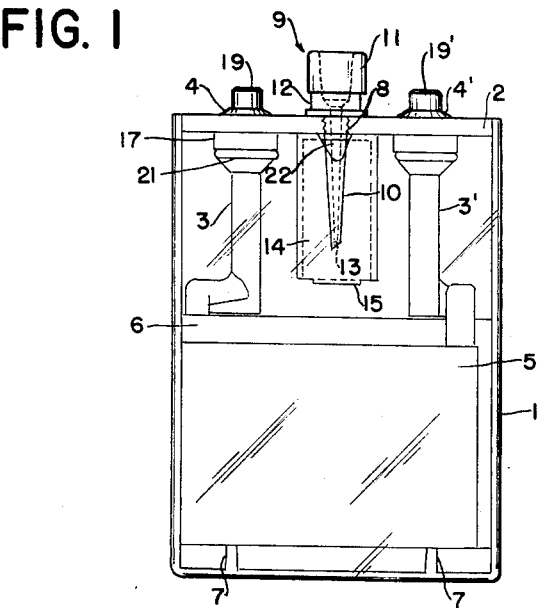
Fig. 1 is a view in elevation of a storage battery cell in which two terminals are shown in accordance with the invention.

The storage battery cell, as illustrated in the drawing, comprises a seamless case 1 which is closed at the top by a coverplate 2. Although various electrolyte-resistant materials, such as hard rubber, glass and Bakelite, have been commonly employed for storage battery cell cases, in the example here illustarted the material is of a transparent plastic, poly-methylmethacrylate. The coverplate 2 is of the same plastic, the two being permanently cemented together. Materials of this nature can be cemented so firmly that the joint is equivalent to a weld. From the coverplate 2 the positive plate and negative plate assemblies are suspended by means of lead terminal posts 3 and 3', respectively. The terminal posts 3, 3' pass through grommets 4, 4' and are thereby supported and hermetically sealed in the coverplate. One of the negative plates 5 is shown in Fig. 1, but the adjacent positive plate is hidden behind the usual separator 6. The plates and separators are supported at the bottom by resting against ribs 7 which are molded integrally with the case.

It is necessary to include a filler hole and vent plug in the top of each cell case so that electrolyte solution and occasionally water, can be poured in, as well as to permit the escape of gas, usually hydrogen, which is formed during charging of the cell. The filler hole 8 through the coverplate is threaded, and in it the vent plug 9 can be manually screwed. This plug is so designed that it permits escape of gas and yet prevents any liquid electrolyte from escaping. Hence this type of battery cell is non-spillable. Plug 9, as can be seen in the drawing, comprises an inner tapered tube 10 of which the end is preferably cut at an angle, as shown. The portion which passes through the threaded hole 8 is similarly threaded, and the exterior portion terminates in a knob 11 which carries a shoulder 12 just above the threaded portion. This permits a sealing washer of rubber, or the like, to be interposed between the shoulder and the upper face of coverplate 2. An inner vent hole 13 extends from one end of the plug to the other. At its upper end, within the knob, this hole is enlarged by approximately three times. In order to prevent electrolyte from entering the lower, open end of vent hole 13, a cylinder 14, of the same material as the case, is cemented at its upper end to the lower surface of the coverplate. The lower end of cylinder 14 is closed across its central portion by a baffle 15 which is cemented to the cylinder. This baffle prevents electrolyte from splashing against the end of tube 10, but any liquid which flows into the cylinder 14 will flow out again on either side of the baffle, or through overflow holes 22 at the top of the cylinder.

Figure 2:
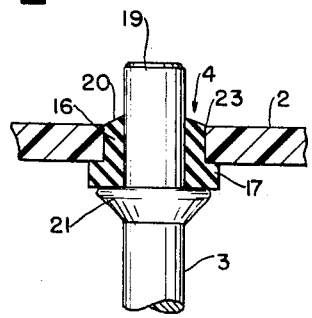
Fig. 2 is an enlarged view of a terminal as shown in Fig. 1, and illustrates the combination of the terminal post and the sealing grommet in place in a rigid plate, such as the coverplate of the cell of Fig. 1.
Figure 3:
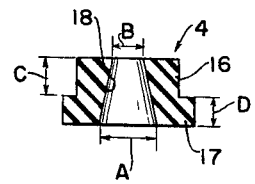
Fig. 3 is a cross-sectional view of a grommet in its undistorted form before assembly as an element of a battery cell terminal.

The novel features of the terminal comprising the present invention will be seen more clearly in Figs. 2 and 3. In order to achieve the new advantages provided by the invention, the material and the proportions of the grommet and the manner of its cooperation with the coverplate and with the terminal post are important. Fig. 3 illustrates a preferred form of grommet according to the invention, in its normal or undistorted condition. It will be seen to comprise a stem portion 16 and a flange portion 17 at one end of the stem and preferably integral therewith. The dimension C which comprises the length of the stem is substantially the same as the thickness of the coverplate 2 through which it passes. The external diameter of the stem is that of the hole 23 in the coverplate 2, the stem preferably making a snug fit therein. It need not initially be a tight fit for the reason below explained. The diameter of the flange 17, whether or not the flange be round in shape, should be greater than that of the mentioned hole in the coverplate. The thickness D of flange 17 should be sufficient to prevent distortion of the flange when the terminal post is forced through the grommet.

The self-sealing feature of the invention is dependent upon the fact that the central aperture 18 through the grommet is normally tapered as shown in Fig. 3. The larger diameter A of the aperture should be approximately that of the end 19 of the terminal post which is to be inserted in it. To facilitate assembly, diameter A can slightly exceed the diameter of end 19. The opposite end of aperture 18 is of diameter B, which is considerably less than that of A. It has been found that with materials having the resiliency and compressibility of medium-soft rubber, and the like, a completely tight seal can be achieved if diameter B is approximately one-half that of diameter A or, in other words, one-half the diameter of the post which passes through it.

By reference to Fig. 2 it will be seen that when the terminal post is forced through the grommet in the direction from A to B, the material of the grommet wall is compressed against the rigid circular wall of hole 18 in coverplate 2 with progressively increasing pressure, because of the progressive increase of thickness of the grommet. It will be noted that the compressive force is exerted essentially in a plane parallel to the surface of the cover plate. The material of the grommet stem which, for the above reason, is displaced in the direction A to B, forms a fillet or beveled surface 20 which constitutes evidence of the high degree of compression of the grommet material and of the tightness of the seals between the post and grommet and the grommet and coverplate. The fillet itself also appears to improve the seal. For many purposes it has been found that a post having a top portion 19 of uniform diameter is preferable, although posts with slight tapers can be used, if the taper of aperture 18 in the grommet is correspondingly increased. If a post having a tapered end is desired in order to fit certain types of terminal lugs, such taper can be provided along the exposed portion of end 19 of the post while retaining the portion of the post which remains within the grommet of the preferred uniform diameter. Because of the wedging effect of the grommet taper, it becomes substantially impossible to force the post down into the cell, in spite of the fact that there is no rigid interconnection. Furthermore, the high degree of compression of the grommet material increases its density and thereby enhances the rigidity of the assembly.

Soft natural rubber has been mentioned above as material suitable for the grommets because it has been found to provide certain advantages. Among these are its compressibility, its lasting resiliency and its tendency to swell slightly when in contact with certain acids. Such swelling, of course, improves the seal. Other materials can be substituted, however, and these embrace polymers some of which have many of the same characteristics. Such materials include polypropylene, neoprene, polybutylene and polyisobutylene.

A battery cell in accordance with the invention is quickly and readily assembled by first placing the two plate assemblies with their separators on ribs 7 in the bottom of the case. The grommets, 4, 4', are then inserted in their respective holes in coverplate 2, with the flanges 17 against the lower surface thereof, and the coverplate pressed down over the terminal posts. This can readily be done because the opening A in the grommets is sufficient to receive the top of the terminal post without forcing. If the post, or the inside of the grommet, is lubricated, as with water for example, the coverplate with its grommets can be forced down over the tops 19, 19' of the posts with less effort than might be expected. The flange 17 of each grommet will then rest upon the upper face of the beveled flange 21 which forms an integral part of the post.

The construction as above described provides a non-spillable and non-leaking storage battery cell which, for its electric capacity, is comparatively light in weight, compact in size and of attractive appearance. In addition, the transparent plastic case permits observation of the condition of the elements contained therein, of the height of the electrolyte, etc. Because of the facts that the cell in accordance with this invention is completely non-leaking and that the material of the case and of the coverplate is tough and not easily fractured, this cell is adapted for use in enclosed spaces, and is especially useful in the vicinity of electronic and similar apparatus which is quickly damaged by the acid which frequently leaks from the storage battery cells heretofore available.

I claim:

1. A self-sealing battery terminal comprising in combination, a coverplate of rigid material having a hole therethrough, a metal terminal post having a substantially straight shank portion of uniform diameter less than the diameter of said hole, and a grommet of resilient, compressible, rubber-like acid-resistant material in said hole, said grommet comprising a stem and a flange disposed at one end of the stem, said stem having an external diameter substantially the same as the diameter of said hole, and said flange being of diameter greater than that of said hole whereby to abut against a surface of said coverplate, said stem, when undistorted, being of length substantially equal to the thickness of said coverplate, said grommet, when uncompressed, having a uniformly tapered central aperture therethrough, said aperture having a diameter at the shoulder end substantially equal to that of the shank portion of said post and a diameter at the other end substantially less than the diameter of said shank portion, the external diameter of the stem of the grommet and the taper through said stem being so correlated to the diameter of the hole in the coverplate and to the diameter of the shank portion of the post that when the shank portion of the post is forced into the aperture of the grommet in the direction towards the smaller diameter of the aperture, the grommet will be compressed to such an extent that a compressive force is exerted between the outer surface of the stem of the grommet and the coverplate sufficient to normally maintain the grommet in the hole in the coverplate, and a compressive force is exerted between the shank portion of the post and the grommet sufficient to normally prevent removal of the shank portion of the post from the grommet, whereby an effective hermetic seal is maintained between the stem of the grommet and the coverplate and between the shank portion of the post and the grommet.

2. A self-sealing battery terminal comprising in combination, a coverplate of rigid material having a hole therethrough, a metal terminal post having a substantially straight shank portion of uniform diameter less than the diameter of said hole, and a grommet of compressible, resilient rubber in said hole, said grommet comprising a stem and an integral flange disposed at one end of the stem, said stem having an external diameter substantially the same as the diameter of said hole, and said flange being of diameter greater than that of said hole whereby to abut against the under surface of said coverplate, said stem, when undistorted, being of length substantially equal to the thickness of said coverplate, said grommet, when uncompressed, having a uniformly tapered central aperture therethrough, said aperture having a diameter at the shoulder end substantially equal to that of the shank portion of said post and a diameter at the other end substantially equal to one-half the diameter of said shank portion, the external diameter of the stem of the grommet and the taper through said stem being so correlated to the diameter of the hole in the coverplate and to the diameter of the shank portion of the post that when the shank portion of the post is forced into the aperture of the grommet in a direction towards the smaller diameter of the aperture, the grommet will be compressed to such an extent that a compressive force is exerted between the outer surface of the stem of the grommet and the coverplate sufficient to normally maintain the grommet in the hole in the coverplate and a compressive force is exerted between the shank portion of the post and the grommet sufficient to normally prevent removal of the shank portion of the post from the grommet, whereby an effective hermetic seal is maintained between the stem of the grommet and the coverplate and between the shank portion of the post and the grommet.

3. Means for supporting and hermetically sealing a battery terminal post, or the like, in a hole through a coverplate of rigid material, said means comprising a grommet of resilient, compressible material formed with a stem portion and an integral flange portion disposed at one end of the stem, said stem having an external diameter such as to fit snugly in said hole and said flange having a diameter greater than said hole, said stem when undistorted being of length substantially equal to the thickness of said plate, said grommet, when undistorted, having a uniformly tapered central aperture therethrough, the maximum diameter of said aperture being at the shoulder end of the grommet and being such as to receive said post without substantial distortion of said grommet at the shoulder when the post is inserted therein, and the minimum diameter of said aperture being at the opposite end of the grommet and, when undistorted, being considerably less than that of the maximum diameter thereof, the external diameter of the stem of the grommet and the taper through said stem being so correlated to the diameter of the hole in the coverplate and to the diameter of the post that when the post is forced into the aperture of the grommet in a direction towards the smaller diameter of the aperture, the grommet will be compressed to such an extent that a compressive force is exerted between the outer surface of the stem of the grommet and the coverplate sufficient to normally maintain the grommet in the hole in the coverplate and a compressive force is exerted between the post and the grommet sufficient to normally prevent removal of the post from the grommet, whereby an effective hermetic seal is maintained between the stem of the grommet and the coverplate and between the post and the grommet.

4. A grommet adapted to support and hermetically seal a battery terminal post or the like, in a hole through a plate of rigid material, said grommet comprising material of flexible rubber, or the like, having a straight, smooth stem portion and a flange portion integral with and of greater diameter than the stem, and a central longitudinal aperture through said grommet, said aperture being substantially uniformly tapered, having its maximum diameter at the flange end of the grommet and its minimum diameter at the opposite end of the grommet, the ratio of maximum to minimum diameters being of the order of 2 to 1, the external diameter of the stem of the grommet and the taper through said stem being so correlated to the diameter of the hole in said plate and to the diameter of the post that when the post is forced into the aperture of the grommet in a direction towards the smaller diameter of the aperture, the grommet will be compressed to such an extent that a compressive force is exerted between the outer surface of the stem of the grommet and the plate sufficient to normally maintain the grommet in the hole in the plate and a compressive force is exerted between the post and the grommet sufficient to normally prevent removal of the post from the grommet, whereby an effective hermetic seal is maintained between the stem of the grommet and the plate and between the post and the grommet.

5. In combination, a cylindrical terminal post, or the like, and means for supporting and hermetically sealing the same in a plate of rigid material, said plate having an underside and an upperside and a hole therethrough in which said terminal is adapted to be positioned said means comprising a grommet of resilient, compressible material formed with a stem portion and an integral flange portion disposed at one end of the stem, said stem having an external diameter such as to fit snugly in said hole when inserted from the underside of said plate, and said flange having a diameter greater than said hole, said stem when undistorted being of a length substantially equal to the thickness of said plate, said grommet when undistorted having a uniformly-tapered central aperture therethrough, the maximum diameter of said aperture being at the shoulder end of the grommet and being such as to receive said post without substantial distortion of said grommet at the shoulder when inserted therein, the minimum diameter of said aperture being at the opposite end of the grommet and, when undistorted, being considerably less than that of the maximum diameter thereof, the portion of said post which is within said aperture being of substantially-uniform diameter and being disposed in said aperture so as to compress the stem of said grommet against the wall of the hole in said plate and to displace grommet material so as to form a fillet thereof on the upper side of said plate, the external diameter of the stem of the grommet and the taper through said stem being so correlated to the diameter of the hole in the plate and to the diameter of the post that when the post is forced into the aperture of the grommet in a direction towards the smaller diameter of the aperture, the grommet is compressed to such an extent that a compressive force is exerted between the outer surface of the stem of the grommet and the plate sufficient to normally maintain the grommet in the hole in the plate and a compressive force is exerted between the post and the grommet sufficient to normally prevent removal of the post from the grommet, whereby an effective hermetic seal is maintained between the stem of the grommet and the plate between the post and the grommet.

6. A grommet of resilient, compressible material for forming a seal between a terminal post of a storage battery and an opening in the cover plate of the battery, having a hollow stem portion adapted to be received in said opening and to receive the terminal post, and a flange at one end of the stem adapted to lie against the undersurface of a cover plate, around said opening, the aperture in the hollow stem being tapered and converging towards the end of the stem remote from said flange, the external diameter of the stem of the grommet and the taper through said stem being so correlated to the diameter of the hole in said plate and to the diameter of the post that when the post is forced into the aperture of the grommet in a direction towards the smaller diameter of the aperture, the grommet will be compressed to such an extent that a compressive force is exerted between the outer surface of the stem of the grommet and the plate sufficient to normally maintain the grommet in the hole in the plate and a compressive force is exerted between the post and the grommet sufficient to normally prevent removal of the post from the grommet, whereby an effective hermetitc seal is maintained between the stem of the grommet and the plate and between the post and the grommet.

References Cited in the file of this patent

UNITED STATES PATENTS

| | | |
|---|---|---|
| 1,220,603 | Cartwright | Mar. 27, 1917 |
| 1,364,469 | Woodbridge | Jan. 4, 1921 |
| 2,169,967 | Smith | Aug. 15, 1939 |

FOREIGN PATENTS

| | | |
|---|---|---|
| 22,607 | Great Britain | Jan. 19, 1901 |
| 6,710 | Great Britain | Nov. 7, 1907 |
| 1,117,303 | France | May 22, 1956 |
| 824,655 | Germany | Nov. 8, 1951 |